(12) United States Patent
Dupay et al.

(10) Patent No.: US 10,118,657 B2
(45) Date of Patent: Nov. 6, 2018

(54) ACTIVE FIFTH WHEEL REPOSITIONING SLIDER

(71) Applicant: SAF-HOLLAND, Inc., Holland, MI (US)

(72) Inventors: Steven Dupay, Holland, MI (US); Ahmad Nizam Mohamad Jembari, Grand Haven, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 0 days.

(21) Appl. No.: 15/425,445

(22) Filed: Feb. 6, 2017

(65) Prior Publication Data

US 2017/0144714 A1 May 25, 2017

Related U.S. Application Data

(63) Continuation-in-part of application No. PCT/US2015/041545, filed on Jul. 22, 2015.
(Continued)

(51) Int. Cl.
| *B62D 53/08* | (2006.01) |
| *F16H 1/22* | (2006.01) |
| *F16H 19/04* | (2006.01) |

(52) U.S. Cl.
CPC ..... *B62D 53/0814* (2013.01); *B62D 53/0807* (2013.01); *F16H 1/222* (2013.01); *F16H 19/04* (2013.01); *F16H 2019/046* (2013.01)

(58) Field of Classification Search
CPC .................. B62D 53/0807; B62D 53/0814
See application file for complete search history.

(56) References Cited

U.S. PATENT DOCUMENTS 1,977,014 A * 10/1934 Robb ..................... B62D 53/08
280/416.3
4,429,892 A * 2/1984 Frampton .......... B62D 53/0814
280/407

(Continued)

FOREIGN PATENT DOCUMENTS

| CN | 102712342 | 10/2012 |
| CN | 202935458 | 5/2013 |
| KR | 20060070083 | 6/2006 |

OTHER PUBLICATIONS

United States Patent Office, International Search Report, dated Sep. 21, 2015.

*Primary Examiner* — Kevin Hurley
(74) *Attorney, Agent, or Firm* — Price Heneveld LLP

(57) ABSTRACT

A fifth wheel hitch adjustment arrangement for adjusting a position of a fifth wheel hitch plate along a length of a vehicle frame, the fifth wheel hitch adjustment arrangement including a fifth wheel hitch plate, a support arrangement coupled to the fifth wheel hitch plate such that the fifth wheel hitch plate can be moved between a first position along a length of a vehicle frame and a second position along the length of the vehicle frame that is different than the first position, and a drive assembly adapted to couple to a vehicle frame and coupled to the support arrangement, the drive assembly including a rack-and-pinion arrangement, the rack-and-pinion arrangement including a rack member engaging at least one pinion member, the at least one pinion member engaging the rack member of the support arrangement to move the fifth wheel hitch plate between the first and second positions.

29 Claims, 9 Drawing Sheets

Related U.S. Application Data

(60) Provisional application No. 62/033,421, filed on Aug. 5, 2014.

(56) References Cited

U.S. PATENT DOCUMENTS

| | | | |
|---|---|---|---|
| 5,863,057 A * | 1/1999 | Wessels | B62D 53/068 |
| | | | 280/149.2 |
| 5,915,713 A * | 6/1999 | Kniep | B62D 53/0807 |
| | | | 280/418.1 |
| 7,862,067 B2 * | 1/2011 | Alguera | B62D 35/001 |
| | | | 280/407 |
| 2005/0191147 A1 | 9/2005 | Engle | |
| 2009/0160159 A1 | 6/2009 | Alguera | |
| 2011/0015830 A1 | 1/2011 | Chen et al. | |
| 2011/0068557 A1 | 3/2011 | Brown et al. | |
| 2012/0007336 A1 | 1/2012 | Sibley, Jr. et al. | |

* cited by examiner

ACTIVE FIFTH WHEEL REPOSITIONING SLIDER

CROSS-REFERENCE TO RELATED APPLICATIONS

This application is a continuation-in-part of International Application No. PCT/US2015/041545, filed on Jul. 22, 2015, entitled "ACTIVE FIFTH WHEEL REPOSITIONING SLIDER," which claims the benefit of U.S. Provisional Patent Application No. 62/033,421, filed on Aug. 5, 2014, entitled "ACTIVE FIFTH WHEEL REPOSITIONING SLIDER," the entire disclosures of which are incorporated herein.

BACKGROUND OF THE INVENTION

The present invention relates to a fifth wheel hitch support arrangement, and specifically to an active fifth wheel repositioning slider mechanism and system for automatically adjusting the relative position of a supported fifth wheel hitch plate along the length of an associated vehicle frame rail.

BRIEF SUMMARY OF THE INVENTION

One aspect of the present invention is a fifth wheel hitch adjustment arrangement for adjusting a position of a fifth wheel hitch plate along a length of a vehicle frame, wherein the fifth wheel hitch adjustment arrangement comprises a fifth wheel hitch plate, a support arrangement coupled to the fifth wheel hitch plate such that the fifth wheel hitch plate can be moved between a first position along a length of a vehicle frame and a second position along the length of the vehicle frame that is different from the first position, and a drive assembly adapted to couple to a vehicle frame and coupled to the support arrangement. The drive assembly includes a rack-and-pinion arrangement, with the rack-and-pinion arrangement including a rack member engaging at least one pinion member. The at least one pinion member engages the support arrangement to move the fifth wheel hitch plate between the first and second positions.

Another aspect of the present invention is a fifth wheel hitch adjustment arrangement for adjusting a position of a fifth wheel hitch plate along a length of a vehicle frame, wherein the fifth wheel hitch adjustment arrangement comprises at least one sensor configured to sense an operating parameter of vehicle operation and produce a first signal based on a state of the operating parameter, a control configured to receive and process the first signal and produce a second signal based on the first signal, an actuator arrangement configured to receive the second signal and move an actuator member based on the second signal, and a fifth wheel hitch arrangement. The fifth wheel hitch arrangement comprises a fifth wheel hitch plate, a support arrangement coupled to the fifth wheel hitch plate such that the fifth wheel hitch plate can be moved between a first position along a length of a vehicle frame and a second position along the length of the vehicle frame that is different from the first position, and a drive assembly adapted to couple to the vehicle frame and coupled to the support arrangement, wherein the drive assembly includes a rack-and-pinion arrangement and an actuator. The rack-and-pinion arrangement includes a rack member engaging at least one pinion member. The actuator member is configured to rotate the at least one pinion as the actuator moves the actuator member. The at least one pinion member is configured to engage the support arrangement to move the fifth wheel hitch plate between the first and second positions as the at least one pinion member is rotated.

The present inventive fifth wheel hitch adjustment arrangement provides a durable uncomplicated design that can be easily assembled, is efficient in use, economical to manufacture, is capable of a long operating life, and is particularly well adapted for the proposed use. The fifth wheel hitch adjustment arrangement may be configured to automatically adjust the position of a fifth wheel hitch plate along the length of an associated frame rail, thereby automatically adjusting the relative position of a towed vehicle such as a trailer coupled to the fifth wheel hitch plate relative to the towing vehicle or tractor, thereby resulting in more efficient operation, reduced fuel consumption, greater vehicle handling and vehicle operational characteristics, and the like.

These and other advantages of the present invention will be further understood and appreciated by those skilled in the art by reference to the following specification, claims, and appended drawings.

DETAILED DESCRIPTION OF THE PREFERRED EMBODIMENTS

Figure 1:
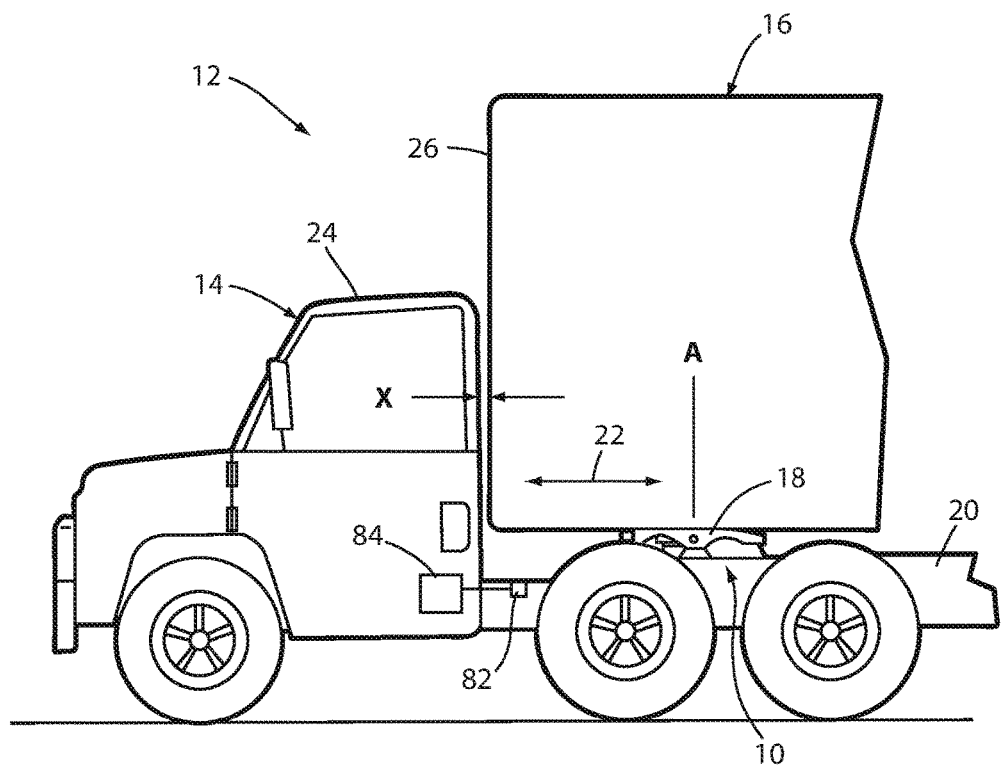
FIG. 1 is an elevational schematic view of a fifth wheel hitch adjustment arrangement within a tractor/trailer vehicle combination, wherein a fifth wheel hitch assembly and supported trailer are shown in a first position.
Figure 2:
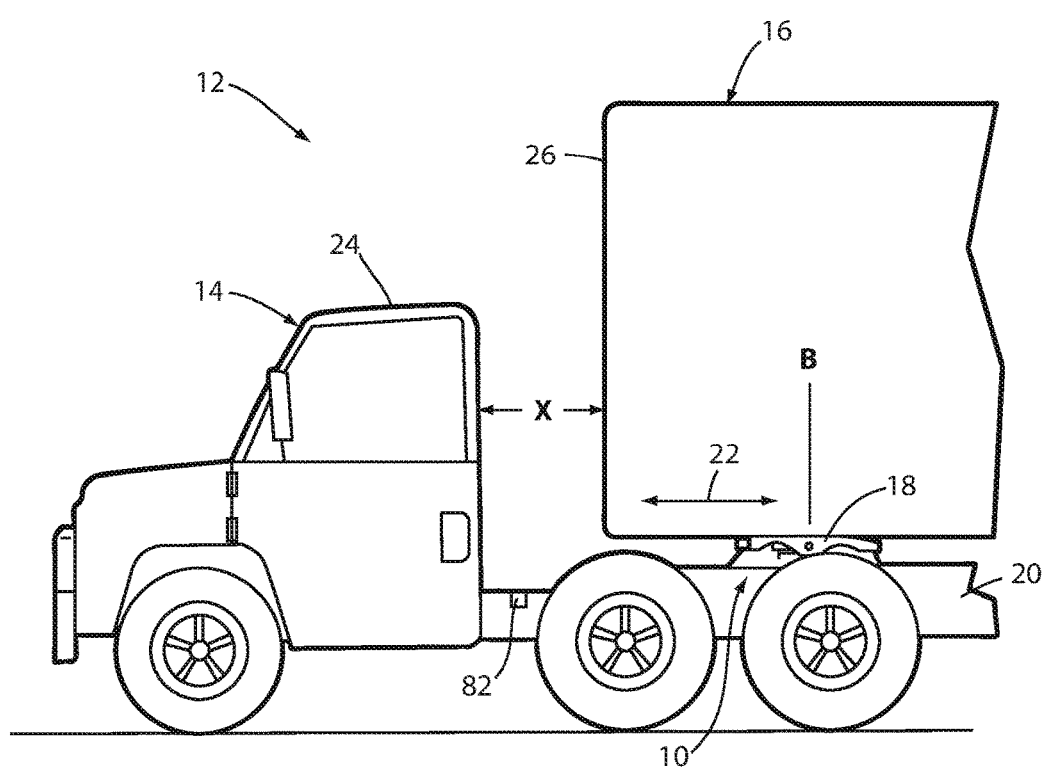
FIG. 2 is a side elevational view of the tractor/trailer vehicle combination with the fifth wheel hitch assembly and supported trailer shown in a second position.
Figure 3:
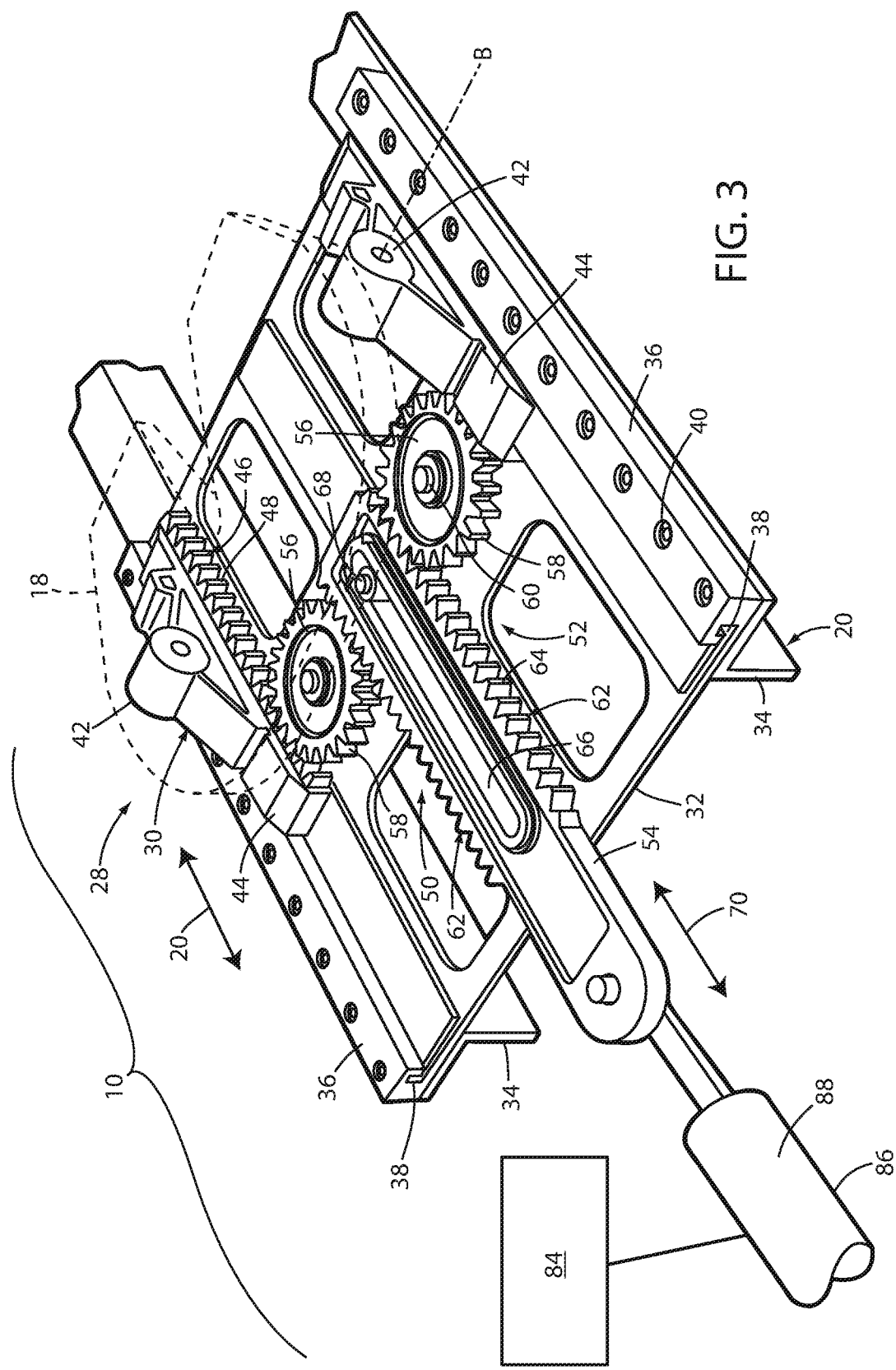
FIG. 3 is a perspective view of a first embodiment of the fifth wheel hitch adjustment arrangement, with the fifth wheel hitch assembly and a support arrangement shown in the second position.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a fifth wheel hitch adjustment arrangement embodying the present invention. In the illustrated example, the adjustment arrangement 10 is situated within a tractor/trailer vehicle combination 12 that includes a towing vehicle, namely a tractor truck 14, and a towed vehicle, namely a trailer 16. The adjustment arrangement 10 is configured to allow the movement of a fifth wheel hitch plate 18 along the length of a vehicle frame 20 in the directions 22 between a first position A and a second position B, thereby adjusting the distance X between a cab 24 of the tractor truck 14 and the box 26 of the trailer 16.

Figure 4:
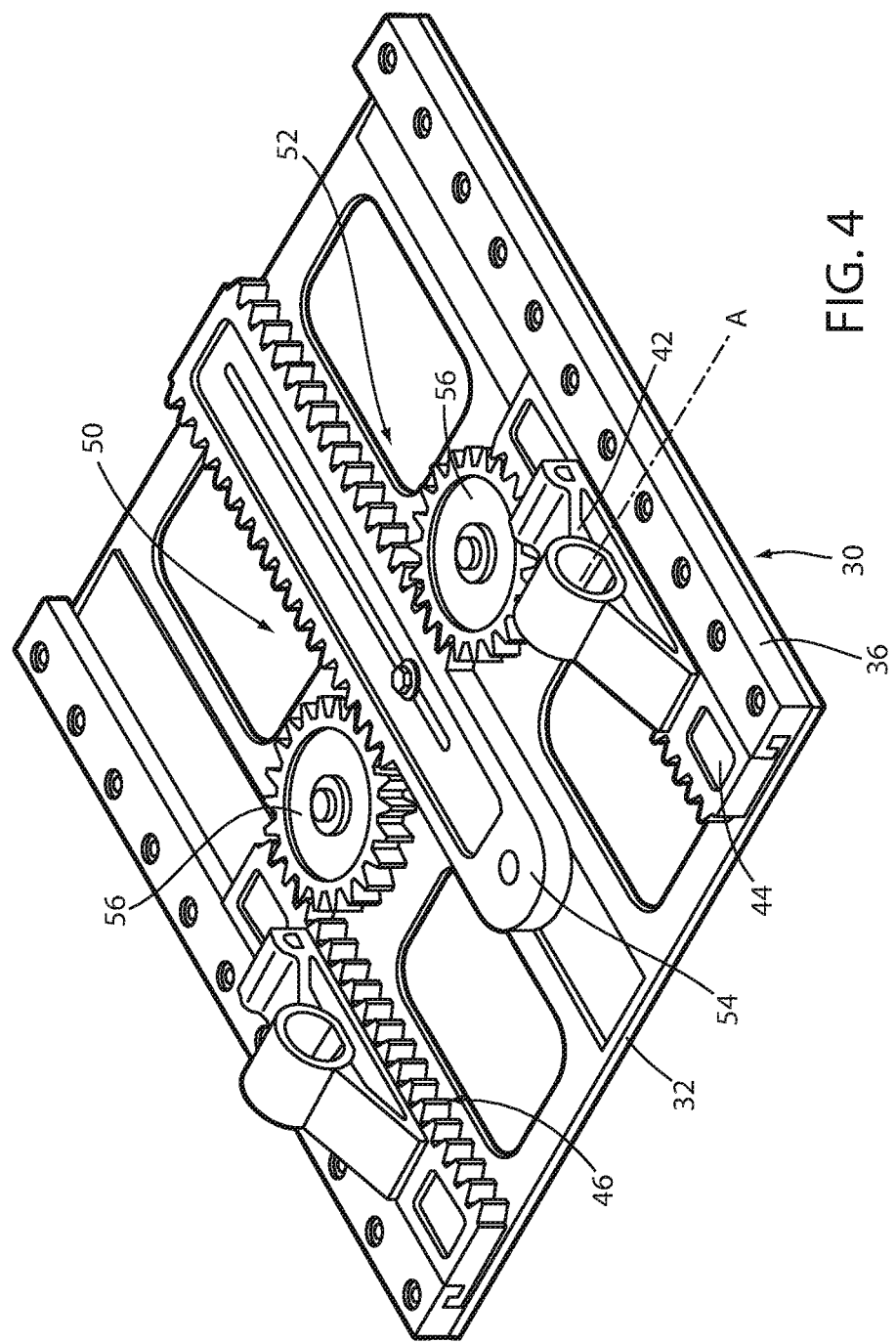
FIG. 4 is a perspective view of the first embodiment of the fifth wheel hitch adjustment arrangement, with the fifth wheel hitch assembly and support arrangement shown in a second position.
Figure 5:
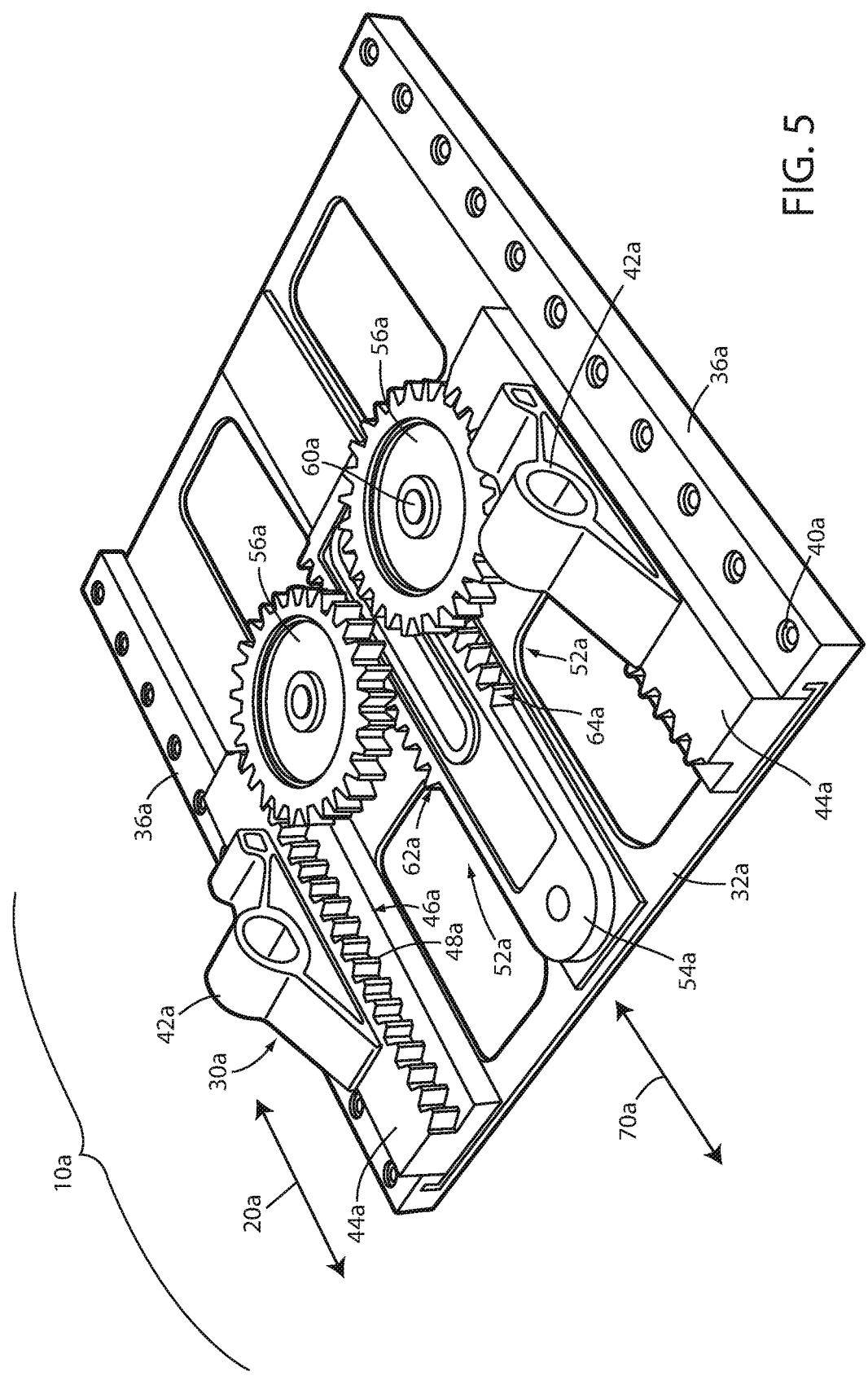
FIG. 5 is a perspective view of a second embodiment of the fifth wheel hitch adjustment arrangement.
Figure 7:
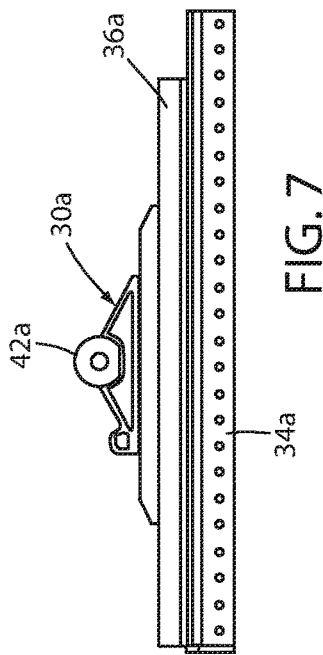
FIG. 7 is a side elevational view of the second embodiment of the fifth wheel hitch adjustment arrangement.
Figure 6:
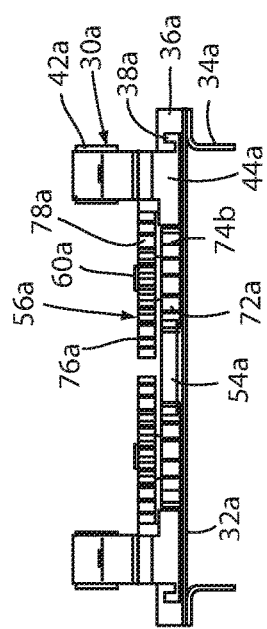
FIG. 6 is an end view of the second embodiment of the fifth wheel hitch adjustment arrangement.
Figure 8:
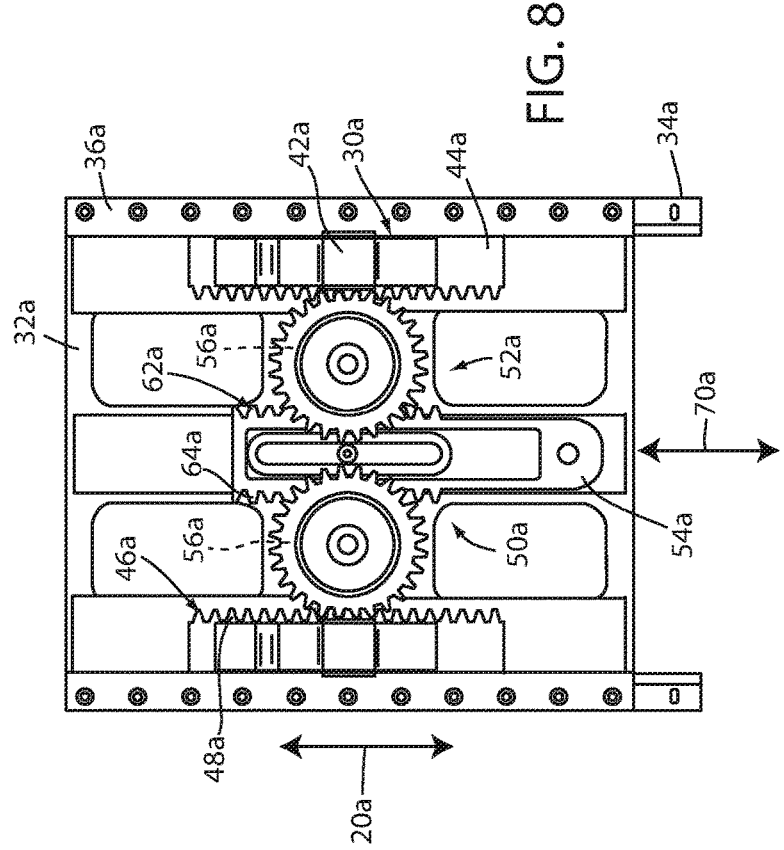
FIG. 8 is a top plan view of the second embodiment of the fifth wheel hitch adjustment arrangement.

As best illustrated in FIG. 3, a fifth wheel hitch arrangement 28 includes the fifth wheel hitch plate 18, and a support arrangement 30 coupled to the fifth wheel hitch plate 18 such that the fifth wheel hitch plate 18 may be moved in the directions 20 between the second or rearward position B (FIG. 3) and the first or forward position A (FIG. 4). In the illustrated example, the support arrangement includes a base plate 32 that extends between a pair of frame rails 34 of the vehicle frame 20. The support arrangement 30 further includes a pair of slide rails 36 spaced from one another across the base plate 32 and extending longitudinally with the frame rails 34. Each slide rail 36 cooperates with base plate 32 to form an inwardly-facing, C-shaped channel 38. The slide rails 36 and the base plate 32 are secured to the vehicle frame rails 34 via a plurality of mechanical fasteners (not shown) inserted through corresponding apertures 40 longitudinally spaced along the slide rails 36. Each support arrangement 30 further includes a pair of mounting brackets 42 secured to a pair of corresponding rack members 44. Each mounting bracket 42 pivotably supports the fifth wheel hitch plate 18 in a manner that is well known in the art. Each rack member 44 slidably engages the corresponding channel 38 of one of the slide rails 36 as described below in relation to the embodiment illustrated in FIG. 6. Each rack member 44 further includes an inwardly disposed rack arrangement 46 comprising a plurality of longitudinally spaced teeth 48.

The adjustment arrangement 10 further includes a drive assembly 50 having a rack-and-pinion arrangement 52 and an actuator member 54. The rack-and-pinion arrangement 52 includes a pair of drive gears 56 spaced across the actuator member 54 from one another and each including a plurality of teeth 58 engaging and intermeshed with the teeth 48 of each rack arrangement 46. Each drive gear 56 is secured to the base plate 32 via a pivot pin 60, thereby securing the drive gears 56 at a fixed position along the length of the vehicle frame 20. In the illustrated example, the actuator member 54 includes a pair of drive racks 62 located on opposite sides of the actuator member 54 and each including a plurality of longitudinally-spaced teeth 64 that engage and are intermeshed with the teeth 58 of the corresponding drive gears 56. The actuator member 54 includes a longitudinally-extending slot 66. A guide pin 68 is fixed to the base plate 32 and guides within the slot 66 of the actuator member 54 as the actuator member 54 travels back and forth in the directions 70.

In operation, the actuator member 54 is actuated in one of the directions 70 such that the drive racks 62 engage the drive gears 56. In turn, the drive gears 56 engage the rack arrangements 46 of the rack members 44, thereby sliding the rack members 44 along the slide rails 46 and moving the mounting brackets 42 in the supported fifth wheel hitch plate 18 between the first and second positions A, B.

The reference numeral 10a (FIGS. 5-8) generally designates another embodiment of the fifth wheel hitch adjustment arrangement. Since the fifth wheel hitch adjustment arrangement 10a is similar to the previously described fifth wheel hitch adjustment arrangement 10, with similar parts appearing in FIGS. 3 and 4 and in FIGS. 5-8 respectively are represented by the same, corresponding reference numeral, except for the suffix "a" in the numerals of the latter. The adjustment arrangement 10a is similar in construction and configuration to the previously described adjustment arrangement 10 with the most notable exception being the configuration of the drive gears 56a. In the illustrated example, each drive gear 56a includes a first portion 72a that includes a plurality of teeth intermeshed with and engaging the teeth 64a of one of the corresponding racks 62a. Each drive gear 56a includes a second portion 76a located above the first portion 72a and including a plurality of teeth 78a that engage and are intermeshed with the teeth 48a of the corresponding rack member 44a. It is noted that the diameter of the second portion 76a is greater than the diameter of the first portion 72a, such that the rate at which the fifth wheel hitch plate 18 is moved between the first and second position A, B is increased by the ratio of the first portion 72a to the second portion 76a of each of the drive gears 56a.

Figure 9:
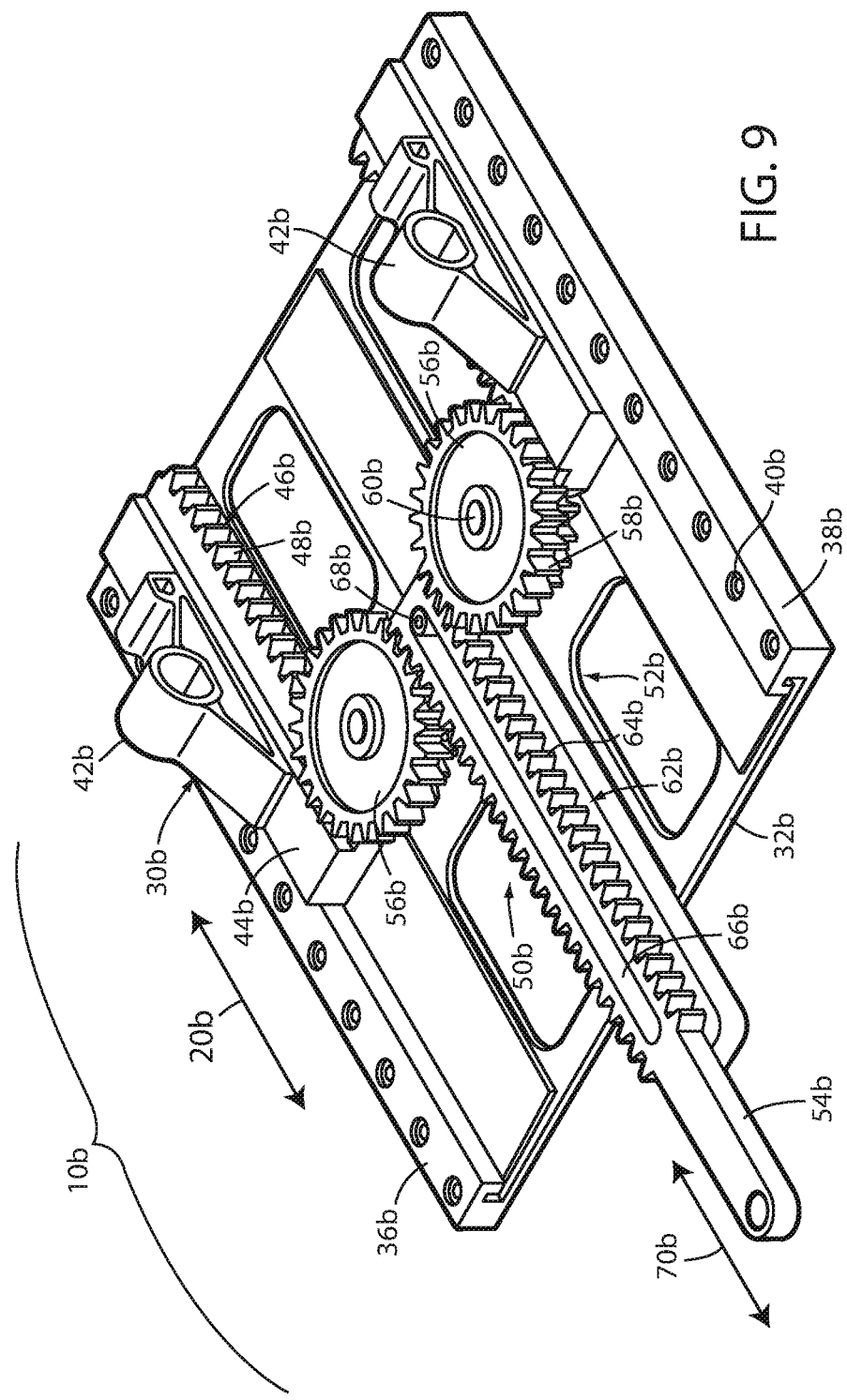
FIG. 9 is a perspective view of a third embodiment of the fifth wheel hitch adjustment arrangement.

The reference numeral 10b (FIG. 9) generally designates yet another embodiment of the present inventive fifth wheel hitch adjustment arrangement. Since the fifth wheel hitch adjustment arrangement 10b is similar to the previously described fifth wheel hitch adjustment arrangement 10a, with similar parts appearing in FIGS. 5-8 and in FIG. 9 respectively are represented by the same, corresponding reference numeral, except for the suffix "b" in the numerals of the latter. The adjustment arrangement 10b is similar in construction and configuration to the previously described adjustment arrangement 10a with the most notable exception being that the adjustment arrangement 10 is configured such that the drive racks 62b of the actuator member 54b engages the second portion 76b of each of the drive gears 56b, and the first portion 72b of the drive gears 56b engage the corresponding rack arrangement 46b of the rack members 44b, thereby amplifying the force exerted by the actuator member 54b by the ratio of the second portion 76b to the first portion 72b.

The fifth wheel hitch adjustment arrangement 10 (FIG. 1) further includes at least one sensor 82 configured to sense an operating parameter of vehicle operation and produce a first signal based on a state of the operating parameter. The operating parameter of vehicle operation may include things such as vehicle speed, orientation of the trailer 16 with respect to the tractor truck 14, orientation of the trailer 16 and/or truck 14 with respect to horizontal, loads exerted on the fifth wheel hitch plate 18, and the like. The fifth wheel hitch adjustment arrangement (FIGS. 1 and 3) further includes a controller 84 configured to receive and process the first signal and to produce a second signal based on the first signal, and an actuator arrangement 86 configured to receive the second signal from the controller 84 and move or actuate the actuator member 54 based on the second signal as received. In the illustrated example, the actuator arrangement 86 includes a hydraulic cylinder 88, however other actuators such as mechanical linkages, servo motors, gear arrangements, pulley systems, and the like may also be utilized.

The controller 84 is configured to interact with the tractor/trailer vehicle combination 12 and the adjustment arrangement 10 to ensure safe and effective operation thereof. The controller 84 couples the commands for fore-aft movement of the fifth wheel hitch plate 18 between positions A, B and determines when/if it is safe and/or appropriate to reposition the fifth wheel hitch plate 18, how far to reposition the fifth wheel hitch plate 18, and ascertain that the fifth wheel hitch plate 18 is securely locked after the reposition.

The controller 84 may be housed in a unit installed at or near the fifth wheel hitch adjustment arrangement 10, or may be located within the towing vehicle 12. The controller may interface not only with a plurality of sensors on the fifth wheel adjustment arrangement 10, but also interrogate into the operational controllers, monitors and sensors of the associated vehicle to determine current vehicle operating parameters, such as speed and the like. Sensors integrated into the adjustment arrangement 10 may include, but are not limited to, a fifth wheel position fore-aft in the slider assembly, current load on the fore-aft positioning mechanism, current state of slider locks (engaged, disengaged), and current state of the fifth wheel lock (locked, open), some of which are discussed above in greater detail. In addition, sensors to determine the permitable repositioning envelope may include current distance from back of tractor cab to front of trailer body (closure gap), as well as current relative orientation (yaw angle) between tractor and trailer. The controller 84 may utilize a logic tree that would evaluate the current operational parameters of the tractor/trailer combination 12 and fifth wheel hitch adjustment arrangement and determine the appropriate "close couple (highway)" or "spread couple (city/maneuver)" positions at which the locking arrangement 90 would actuate. It is noted that a gap distance margin of safety may be included within the calculations, as well as an override to account for special equipment such as a reefer unit.

A manual override input or switch may allow an operator to manually select the close couple (highway) configuration of position A, or the spread couple (city/maneuver) of position B, and to indicate the desired state. The selection of either position A or B may activates the control module logic tree of the controller 84 to determine if it is safe and appropriate to reposition the fifth wheel hitch plate 18 as requested. If the logic tree of the controller 84 confirms that the operator selection is safe and appropriate, the system may initiate the disengagement of the locking arrangements 90, reposition or move the fifth wheel hitch plate 18 to determine position for close couple (highway) (position A) or spread couple (city/maneuver) (position B), re-engagement of the locking arrangement 90, and notify the operator of the new position of the fifth wheel hitch plate 18.

Preferably, the controller 84 may constantly and actively monitor the state of the vehicle tractor/trailer combination speed, relative orientation, and the like, to determine whether a fifth wheel fore-aft reposition is required to avert a safety or vehicle damaging incident. For example, upon slowing down below a certain speed threshold where vehicle maneuverability is increased, the fifth wheel hitch adjustment arrangement 10 would automatically reposition the fifth wheel hitch plate 18 to position B, with an appropriate alert to the operator. In certain embodiments, the adjustment arrangement 10 would not automatically move to position A due only to the fact the controller 84 determines that the active fifth wheel and vehicle states indicate it was safe and appropriate to do so, and that repositioning form position B to position A would occur only upon explicit command from the operator.

Figure 10:
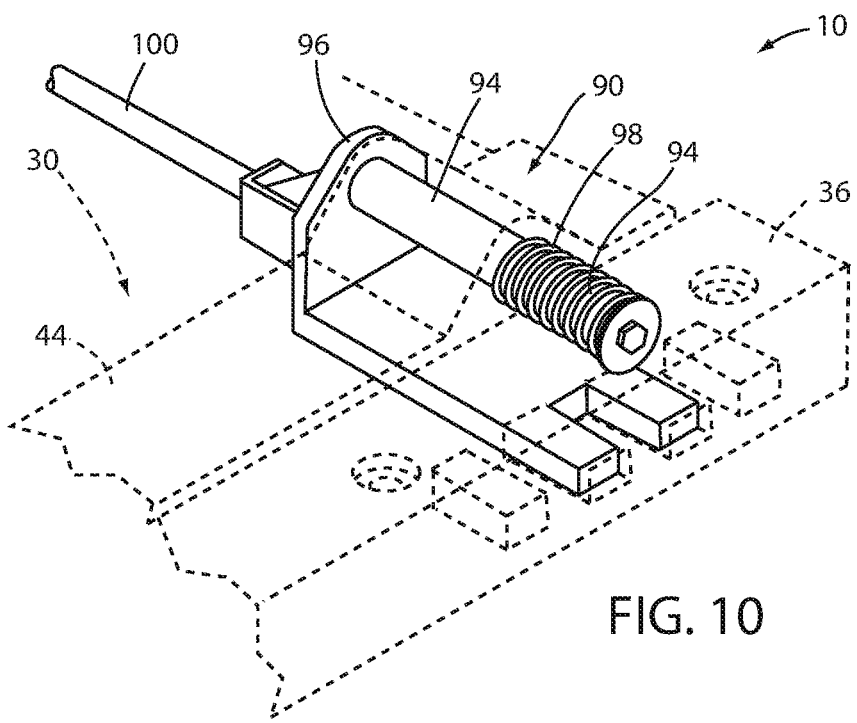
FIG. 10 is a perspective view a locking arrangement shown in a locked configuration.
Figure 11:
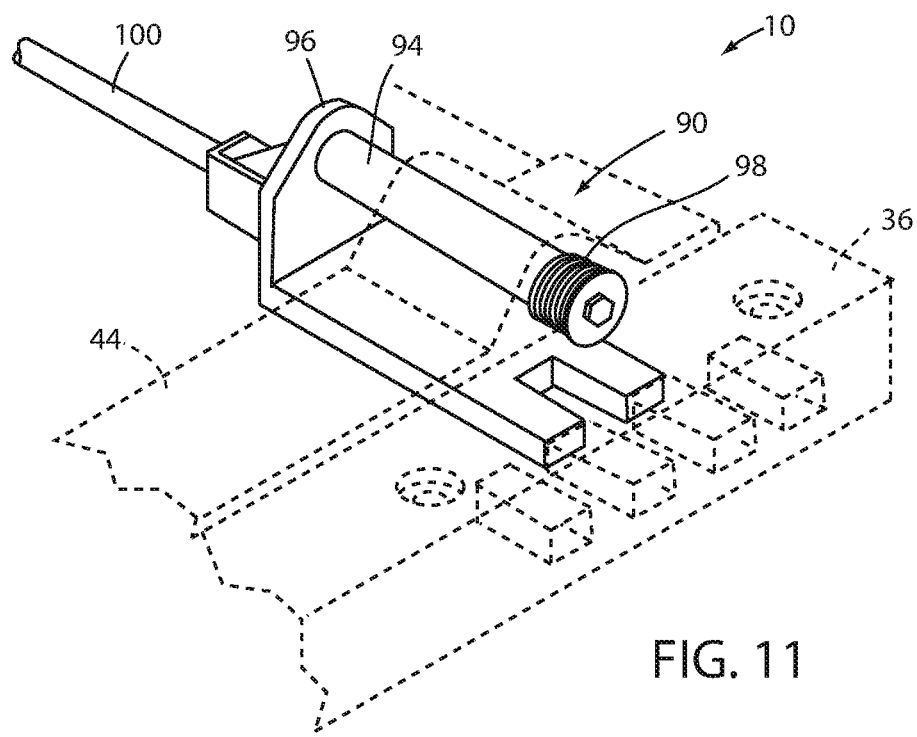
FIG. 11 is a perspective view of the locking arrangement shown in an unlocked configuration.

As best illustrated in FIGS. 10 and 11, the fifth wheel hitch adjustment arrangement 10 further includes a locking arrangement 90 that locks the position of the fifth wheel hitch plate 18 along the length of the vehicle frame 20. In the illustrated example, each locking arrangement 90 includes a locking pin 94 telescopingly positioned within a locking pin housing 94 that is secured to a member of the support arrangement 30 such as the rack member 44 by a support bracket 96. As illustrated, a biasing element such as a coil spring 98 biases the locking pin 92 into engagement with the slide rail 36, thereby preventing the fifth wheel hitch plate 18 from moving between the first and second positions A, B. A mechanical linkage 100 is coupled to the locking pin 92 and configured to overcome the biasing force exerted by the coil spring 98, thereby moving the locking pin 92 from the locked position (FIG. 10) to an unlocked position (FIG. 11), thereby allowing the fifth wheel hitch plate 18 to be moved between the first and second positions A, B.

The present inventive fifth wheel hitch adjustment arrangement provides a durable uncomplicated design that can be easily assembled, is efficient in use, economical to manufacture, is capable of a long operating life, and is particularly well adapted for the proposed use. The fifth wheel hitch adjustment arrangement may be configured to automatically adjust the position of a fifth wheel hitch plate along the length of an associated frame rail, thereby automatically adjusting the relative position of a towed vehicle such as a trailer coupled to the fifth wheel hitch plate relative to the towing vehicle or tractor, thereby resulting in more efficient operation, reduced fuel consumption, greater vehicle handling and vehicle operational characteristics, and the like.

Figure 12:
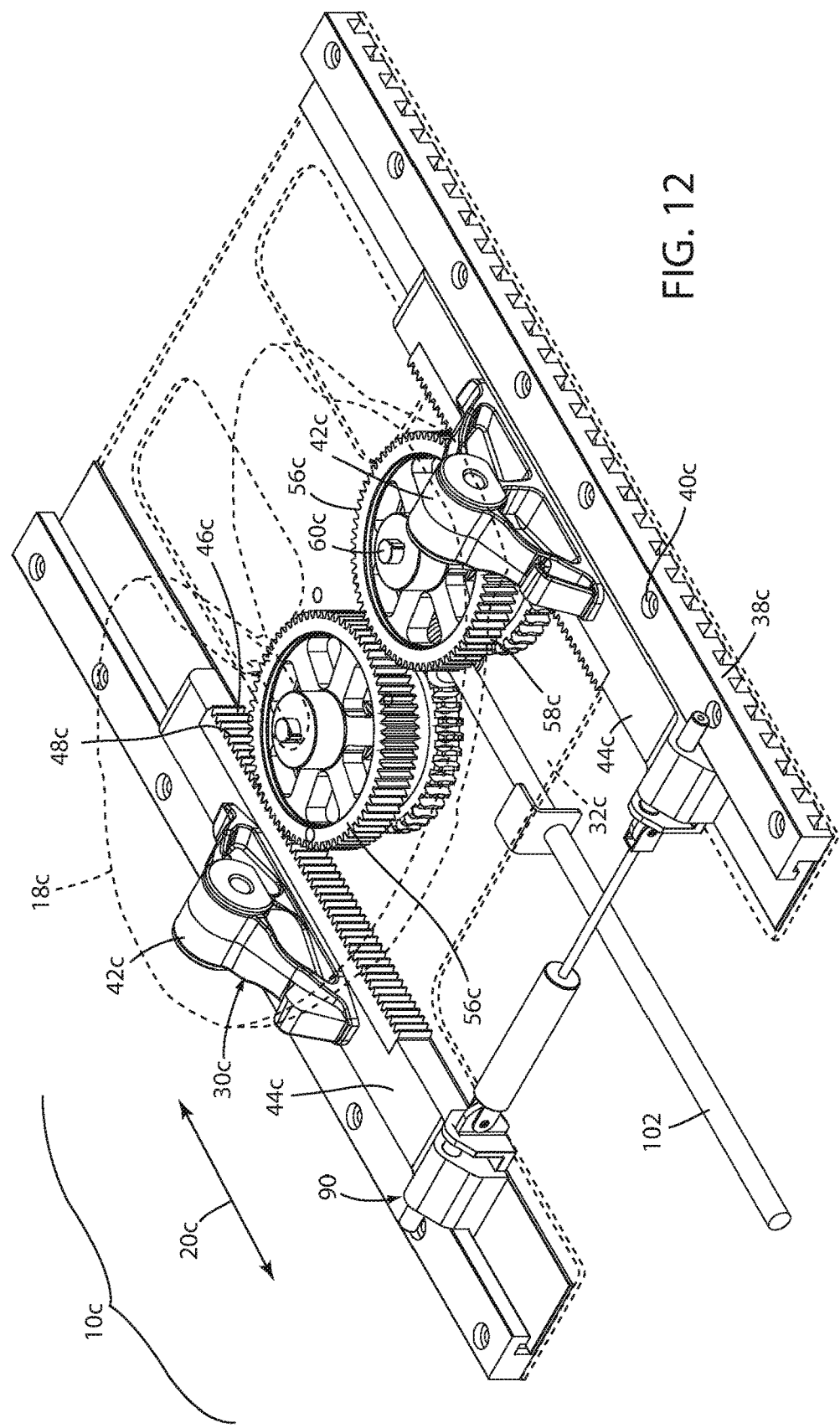
FIG. 12 is a top perspective view of a third embodiment of the fifth wheel hitch adjustment arrangement.
Figure 13:
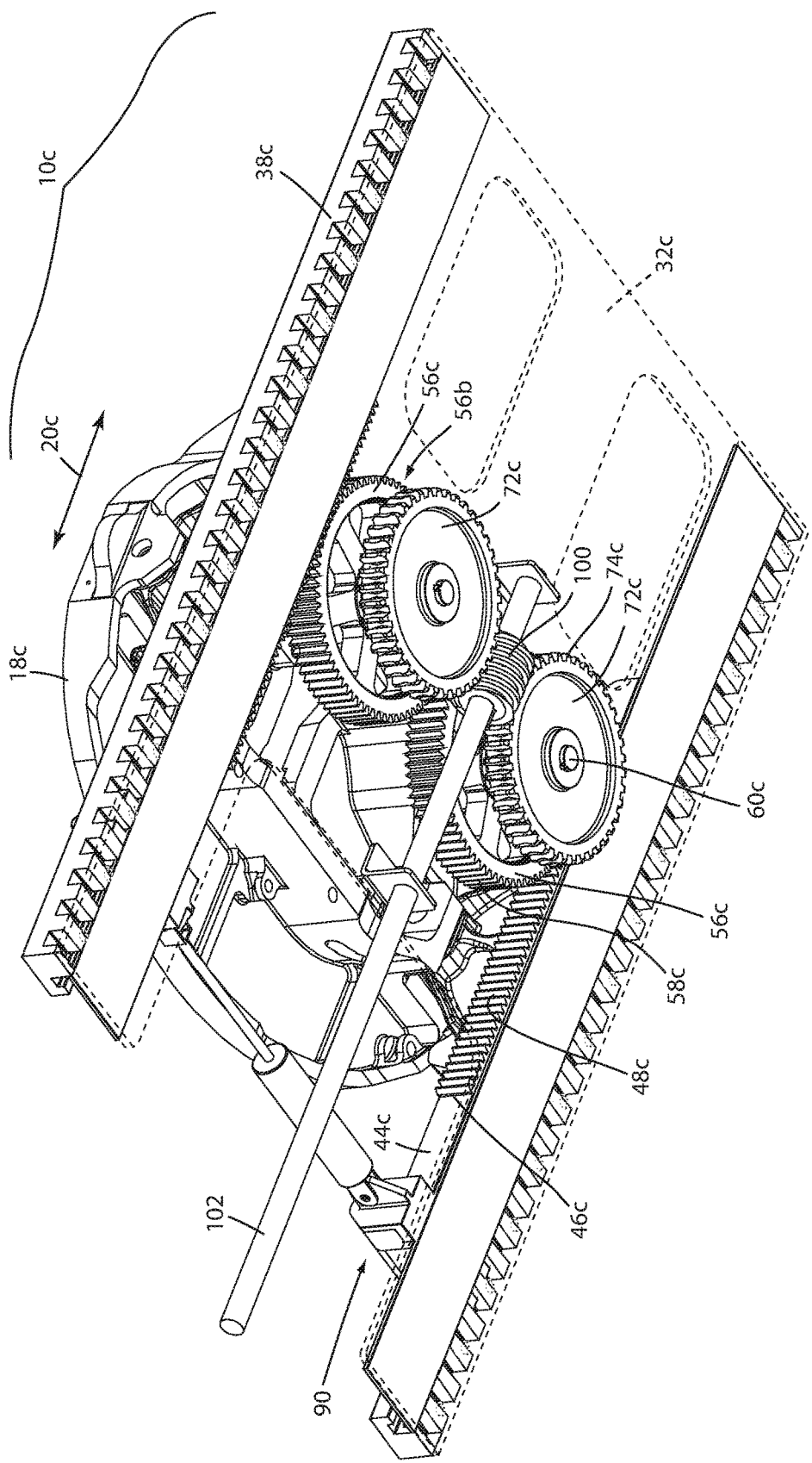
FIG. 13 is a bottom perspective view of the third embodiment of the fifth wheel hitch adjustment arrangement.

The reference numeral 10c (FIGS. 12 and 13) generally designates yet another embodiment of the present inventive fifth wheel hitch adjustment arrangement. Since the fifth wheel hitch adjustment arrangement 10c is similar to the previously described fifth wheel hitch adjustment arrangement 10a, with similar parts appearing in FIGS. 5-8 and in FIGS. 12 and 13 respectively are represented by the same, corresponding reference numeral, except for the suffix "c" in the numerals of the latter. The adjustment arrangement 10c is similar in construction and configuration to the previously described adjustment arrangement 10a with the most notable exception being that the actuator member includes a worm gear 100 that engages the first portion 72c of each of the drive gears 56b, wherein the worm gear 100 is driven in rotation by a drive shaft 102.

In the foregoing description, it will be readily appreciated by those skilled in the art that modifications may be made to the invention without departing from the concepts disclosed herein. Such modifications are to be considered as to be included in the following claims, unless these claims by their language expressly state otherwise.

The invention claimed is:

1. A fifth wheel hitch adjustment arrangement for adjusting a position of a fifth wheel hitch plate along a length of a vehicle frame, the fifth wheel hitch adjustment arrangement comprising:
   a fifth wheel hitch plate;
   a support arrangement coupled to the fifth wheel hitch plate such that the fifth wheel hitch plate can be moved between a first position along a length of a vehicle frame and a second position along the length of the vehicle frame that is different than the first position; and a drive assembly adapted to couple to a vehicle frame and coupled to the support arrangement, the drive assembly including a rack-and-pinion arrangement, the rack-and-pinion arrangement including a rack member engaging at least one pinion member, the support arrangement including the rack member; and the at least one pinion member engaging the rack member of the support arrangement to move the fifth wheel hitch plate between the first and second positions.

2. The fifth wheel hitch adjustment arrangement of claim 1, wherein the support arrangement includes a slide rail and a support bracket arrangement, wherein the support bracket arrangement is coupled to the fifth wheel hitch plate, and wherein the support bracket arrangement slidably engages the slide rail such that the fifth wheel hitch plate is slidably movable between the first and second positions.

3. The fifth wheel hitch adjustment arrangement of claim 2, wherein the slide rail is configured to be attached to the vehicle frame.

4. A fifth wheel hitch adjustment arrangement for adjusting a position of a fifth wheel hitch plate along a length of a vehicle frame, the fifth wheel hitch adjustment arrangement comprising:
a fifth wheel hitch plate;
a support arrangement coupled to the fifth wheel hitch plate such that the fifth wheel hitch plate can be moved between a first position along a length of a vehicle frame and a second position along the length of the vehicle frame that is different than the first position; and
a drive assembly adapted to couple to a vehicle frame and coupled to the support arrangement, the drive assembly including a rack-and-pinion arrangement, the rack-and-pinion arrangement including a rack member engaging at least one pinion member, the at least one pinion member engaging the rack member to move the fifth wheel hitch plate between the first and second positions;
wherein the at least one pinion is fixed at a position along the length of the vehicle frame.

5. A fifth wheel hitch adjustment arrangement for adjusting a position of a fifth wheel hitch plate along a length of a vehicle frame, the fifth wheel hitch adjustment arrangement comprising:
a fifth wheel hitch plate;
a support arrangement coupled to the fifth wheel hitch plate such that the fifth wheel hitch plate can be moved between a first position along a length of a vehicle frame and a second position along the length of the vehicle frame that is different than the first position; and
a drive assembly adapted to couple to a vehicle frame and coupled to the support arrangement, the drive assembly including a rack-and-pinion arrangement, the rack-and-pinion arrangement including a rack member engaging at least one pinion member, the at least one pinion member engaging the rack member to move the fifth wheel hitch plate between the first and second positions;
wherein the rack member of the drive assembly includes at least one drive rack, and wherein the drive assembly includes an actuator member that includes the at least one drive rack that engages the at least one pinion.

6. The fifth wheel hitch adjustment arrangement of claim 5, wherein the at least one pinion includes a first pinion and a second pinion, and wherein the at least one drive rack includes a first drive rack that engages the first pinion and a second drive rack that engages the second pinion.

7. The fifth wheel hitch adjustment arrangement of claim 5, wherein the at least one pinion includes a first gear portion having a first diameter and a second gear portion having a second diameter that is greater than the first diameter, and wherein a select one of the first gear portion and the second gear portion engages the at least one drive rack of the actuator member and the remaining of the first gear portion and the second gear portion engages the rack member of the rack-and-pinion arrangement.

8. The fifth wheel hitch adjustment arrangement of claim 7, wherein the at least one drive rack of the actuator member engages the second gear portion.

9. The fifth wheel hitch adjustment arrangement of claim 5, wherein the actuator member includes a worm gear.

10. The fifth wheel hitch adjustment assembly of claim 9, wherein the at least one pinion includes a first gear portion and a second gear portion, wherein the first gear portion is engaged by the worm gear and the second gear portion engages the rack member of the drive assembly.

11. A fifth wheel hitch adjustment arrangement for adjusting a position of a fifth wheel hitch plate along a length of a vehicle frame, the fifth wheel hitch adjustment arrangement comprising:
a fifth wheel hitch plate;
a support arrangement coupled to the fifth wheel hitch plate such that the fifth wheel hitch plate can be moved between a first position along a length of a vehicle frame and a second position along the length of the vehicle frame that is different than the first position;
a drive assembly adapted to couple to a vehicle frame and coupled to the support arrangement, the drive assembly including a rack-and-pinion arrangement, the rack-and-pinion arrangement including a rack member engaging at least one pinion member, the at least one pinion member engaging the rack member to move the fifth wheel hitch plate between the first and second positions; and
at least one locking arrangement coupled to the support arrangement and operable between a locked configuration, wherein the at least one locking arrangement engages the vehicle frame and prevents the fifth wheel hitch plate configuration from moving between the first and second positions, and an unlocked position, wherein the fifth wheel hitch plate is free to move between the first and second positions.

12. The fifth wheel hitch adjustment arrangement of claim 11, wherein the at least one locking arrangement includes a first locking arrangement and a second locking arrangement located on opposite sides of the drive assembly from one another.

13. A fifth wheel hitch adjustment arrangement for adjusting a position of a fifth wheel hitch plate along a length of a vehicle frame, the fifth wheel hitch adjustment arrangement comprising:
at least one sensor configured to sense an operating parameter of vehicle operation and produce a first signal based on a state of the operating parameter;
a controller configured to receive and process the first signal and to produce a second signal based on the first signal;
an actuator arrangement configured to receive the second signal and move an actuator member based on the second signal; and
a fifth wheel hitch arrangement, comprising:
a fifth wheel hitch plate;
a support arrangement coupled to the fifth wheel hitch plate such that the fifth wheel hitch plate can be moved between a first position along a length of a vehicle frame and a second position along the length of the vehicle frame that is different than the first position; and a drive assembly adapted to couple to the vehicle frame and coupled to the support arrangement, the drive assembly including a rack-and-pinion arrangement and the actuator member, the rack-and-pinion arrangement including a rack member engaging at least one pinion member, wherein the actuator member is configured to rotate the at least one pinion as the actuator moves the actuator member, and wherein the at least one pinion member is configured to engage the rack member of the support arrangement to move the fifth wheel hitch plate between the first and second positions as the at least one pinion member is rotated.

14. The fifth wheel hitch adjustment arrangement of claim 13, wherein the operating parameter sensed by the at least one sensor includes vehicle speed.

15. The fifth wheel hitch adjustment arrangement of claim 14, wherein the second position of the fifth wheel hitch plate is further aft along the vehicle frame than the first position, and wherein the controller is configured control the actuator to move the fifth wheel hitch plate from the first position toward the second position as the vehicle speed decreases.

16. The fifth wheel hitch adjustment arrangement of claim 13, wherein the controller is configured to control the actuator arrangement such that the fifth wheel hitch plate moves between the first and second positions at a rate of at least 4 inches per second.

17. The fifth wheel hitch adjustment arrangement of claim 13, wherein the actuator member is pneumatically driven.

18. The fifth wheel hitch adjustment arrangement of claim 13, further comprising:

a manual override input configured to allow an operator to manually override the controller and allow for manual adjustment of the fifth wheel hitch plate between the first and second positions.

19. The fifth wheel hitch adjustment arrangement of claim 13, further comprising:

a display coupled to the controller and configured to indicate whether the fifth wheel hitch plate is moving between the first and second positions.

20. The fifth wheel hitch adjustment arrangement of claim 13, wherein the support arrangement includes a slide rail and a support bracket arrangement, the support bracket arrangement is coupled to the fifth wheel hitch plate, and wherein the support bracket arrangement slidably engages the slide rail such that the fifth wheel hitch plate is slidably movable between the first and second positions.

21. The fifth wheel hitch adjustment arrangement of claim 20, wherein the slide rail is configured to be attached to the vehicle frame.

22. The fifth wheel hitch adjustment arrangement of claim 13, wherein the support bracket arrangement includes the rack member of the rack-and-pinion arrangement.

23. The fifth wheel hitch adjustment arrangement of claim 13, wherein the at least one pinion is fixed at a position along the length of the vehicle frame.

24. The fifth wheel hitch adjustment arrangement of claim 13, wherein the actuator member includes at least one drive rack that engages the at least one pinion.

25. The fifth wheel hitch adjustment arrangement of claim 24, wherein the at least one pinion includes a first pinion and a second pinion, and wherein the at least one drive rack includes a first drive rack that engages the first pinion and a second drive rack that engages the second pinion.

26. The fifth wheel hitch adjustment arrangement of claim 22, wherein the at least one pinion includes a first gear portion and a second gear portion, and wherein the first gear portion engages the actuator member and the second gear portion engages the rack member of the rack-and-pinion arrangement.

27. The fifth wheel hitch adjustment arrangement of claim 13, wherein the actuator member includes a worm gear.

28. The fifth wheel hitch adjustment arrangement of claim 11, further comprising:

at least one locking arrangement coupled to the support arrangement and operable between a locked configuration, wherein the at least one locking arrangement prevents the fifth wheel hitch plate from being moved between the first and second positions, and an unlocked configuration, wherein the fifth wheel hitch plate is free to move between the first and second positions.

29. The fifth wheel hitch adjustment arrangement of claim 28, further comprising:

a lock adjustment sensor arrangement configured to sense the configuration of the at least one lock arrangement and communicate the configuration of the at least one lock arrangement with a vehicle operator.

* * * * *

UNITED STATES PATENT AND TRADEMARK OFFICE
CERTIFICATE OF CORRECTION

PATENT NO. : 10,118,657 B2
APPLICATION NO. : 15/425445
DATED : November 6, 2018
INVENTOR(S) : Dupay et al.

Page 1 of 1

It is certified that error appears in the above-identified patent and that said Letters Patent is hereby corrected as shown below:

In the Specification

Column 2, Line 50:
After "view" insert -- of --

Column 4, Line 28:
"position" should be — positions —

Column 4, Line 45:
"engages" should be — engage —

Column 5, Line 44:
"activates" should be — activate —

Column 6, Line 1:
"form" should be — from —

In the Claims

Column 6, Claim 1, Line 67:
Delete "and"

Column 9, Claim 15, Line 24:
After "configured" insert -- to --

Signed and Sealed this
Tenth Day of March, 2020

Andrei Iancu
*Director of the United States Patent and Trademark Office*